Jan. 6, 1970 R. E. RASCHE 3,488,653

DIGITAL TO SYNCHRO CONVERTER

Filed April 26, 1966

3 Sheets-Sheet 1

INVENTOR.
ROBERT E. RASCHE

BY [signature]

ATTORNEY

DIGITAL-TO-SYNCHRO CONVERTER

Filed April 26, 1966 3 Sheets-Sheet 2

INVENTOR.
ROBERT E. RASCHE
BY
[signature]
ATTORNEY

Jan. 6, 1970 R. E. RASCHE 3,488,653

DIGITAL-TO-SYNCHRO CONVERTER

Filed April 26, 1966 3 Sheets-Sheet 3

INVENTOR.
ROBERT E. RASCHE
BY
S. C. Yeaton
ATTORNEY

United States Patent Office 3,488,653
Patented Jan. 6, 1970

3,488,653
DIGITAL-TO-SYNCHRO CONVERTER
Robert E. Rasche, Plainview, N.Y., assignor to Sperry Rand Corporation, a corporation of Delaware
Filed Apr. 26, 1966, Ser. No. 545,384
Int. Cl. H04l 3/00; H03k 13/00
U.S. Cl. 340—347 6 Claims

ABSTRACT OF THE DISCLOSURE

Digitally coded information representing an unknown angle is stored in a register. A counter is continually actuated by an A.C. reference voltage. The binary state of each counter stage is continually compared with that of the corresponding register stage. The results of the comparison are applied to a logic circuit which provides an output pulse each time that angular displacement of the A.C. reference voltage equals one of eight predetermined functions of the unknown angle. A second logic means produces two trains of rectangular pulses having duty cycles determined by the time intervals between specified pairs of pulses. The rectangular pulses are passed through filters that remove the harmonics, leaving sinusoidal waves. The sinusoidal waves are applied to a Scott T transformer which converts these waves into voltages suitable for actuating a synchro receiver.

This invention relates to digital-analog converters and more specifically to means for converting digitally coded angle information into analog voltages suitable for positioning the rotor of a receiving synchro.

Many varieties of digital-synchro converters are known in the art. Mechanical shaft angle encoders are well known for instance. These, however, are slow acting and have limited accuracy.

In another type of device, two trains of constant duty-cycle waves are generated in which the phase relationship between wave trains is related to the angle information to be generated. These devices require the use of complex impedances in operational amplifier circuits. Complex impedances, however, cannot be obtained that remain accurate in both phase shift and amplitude over a reasonable frequency band.

Another type of prior art digital-synchro converter contains means for generating two trains of square waves having duty-cycles that are a function of the angle information to be generated. The waveforms employed in these devices, however, have large second harmonic components and exhibit a large D.C. jump at 0°, thus making the filter design extremely difficult.

It is an object of the present invention to provide a digital-synchro converter that is fast acting and highly accurate.

It is another object of the present invention to provide an all-electronic digital-synchro converter that eliminates the need for complex impedances and operational amplifiers.

It is still another object of the present invention to provide an all-electronic digital-synchro converter that uses relatively simple filters and yet provides a smooth transition throughout the entire range of angular output signals.

These and other objects are achieved according to the principles of the present invention by converting the received binary digital signals into stepped rectangular waves having a variable duty-cycle, extracting the fundamental sinusoidal component of these stepped rectangular waves, and combining the resulting sinusoids to generate three conventional synchro stator voltages.

The principles and operation of the present invention may be understood by referring to the following description and the accompanying drawings.

In a presently preferred embodiment, angle information enters the converter as a ten bit parallel binary number. The input angle $\theta$ represents the angle to be converted and may vary between 0° and 360°. An input word consisting entirely of binary ZEROES represents 0° of rotation and a word consisting entirely of binary ONES represents 359° 39′ of rotation.

Intermediate angular magnitudes are represented by combinations of binary digits having corresponding intermediate binary coded values.

Figure 1:
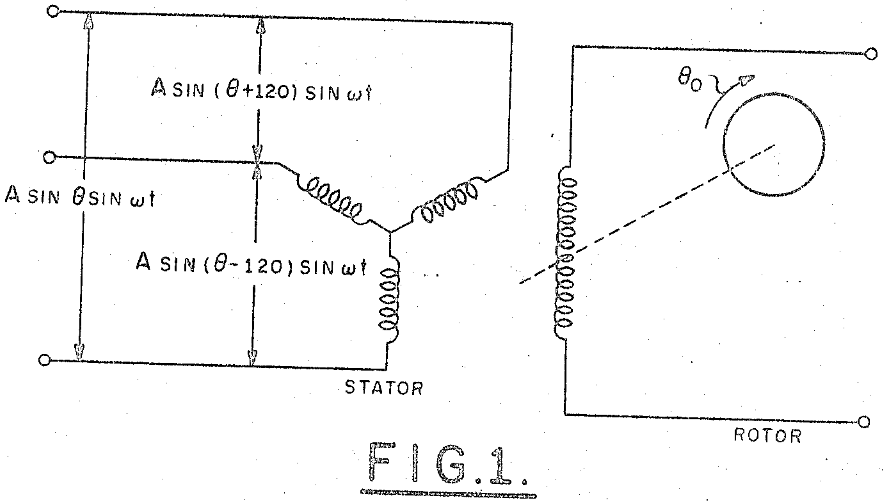
FIG. 1 is a diagram illustrating the voltages necessary to operate a synchro receiver.

The converter must convert the input binary words into signals constituting three sinusoidal stator voltages suitable for actuating a synchro receiver as indicated in FIG. 1.

Figure 2:
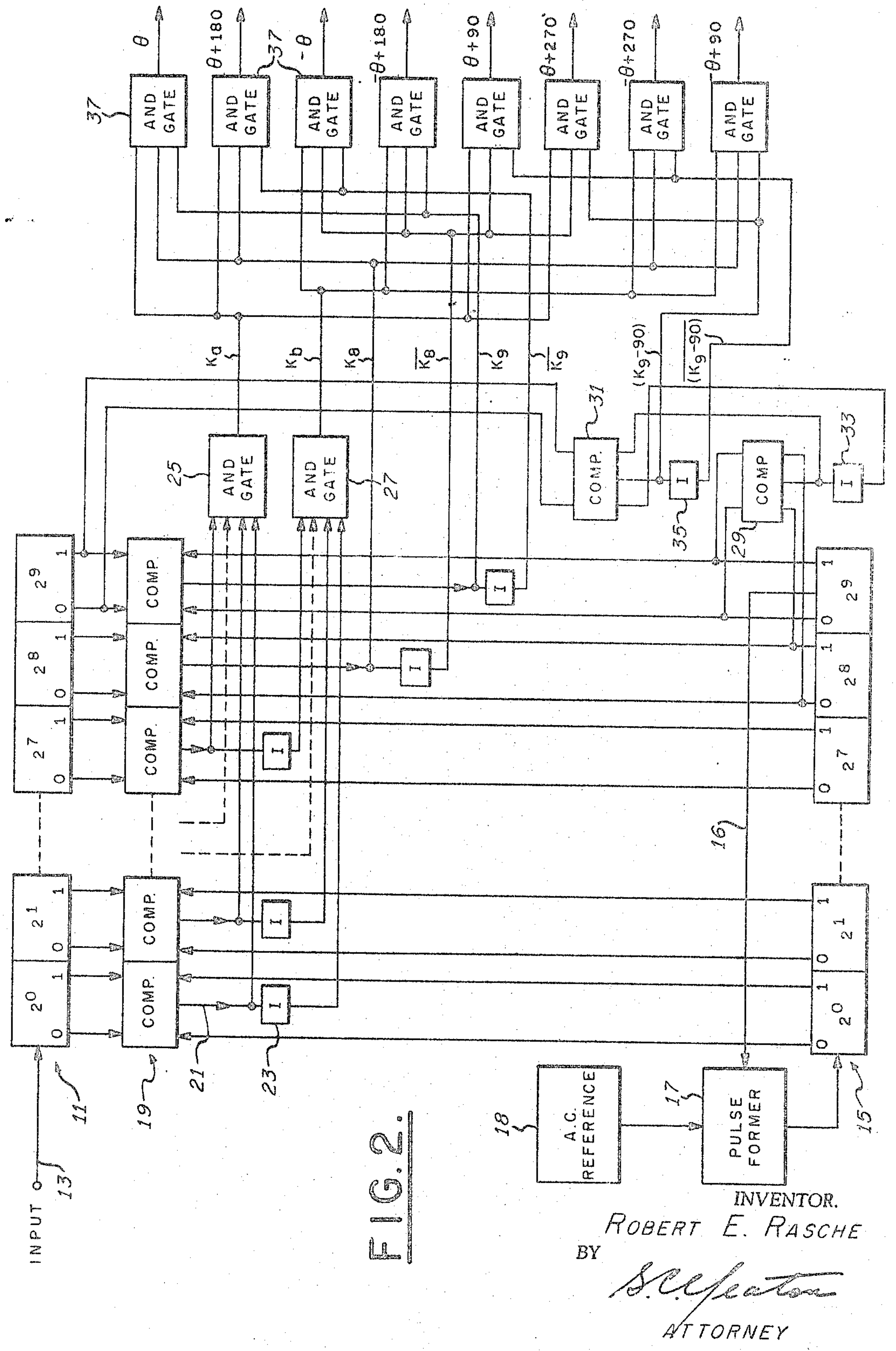
FIG. 2 is a block diagram illustrating a comparator circuit useful in practicing the invention.

FIG. 2 represents a specific comparator circuit that may be used in practicing the invention. This comparator portion of the overall circuit receives the digitally coded angle information and provides switching pulses whose timing varies with the angle $\theta$ to be decoded.

In the circuit of FIG. 2, the binary coded digital information is applied to a ten bit register 11 through an input terminal 13. A ten bit counter 15 is actuated by means of counting pulses that are formed in a pulse former 17. The counter is also phase locked to an A.C. reference source 18 through a line 16. The source 18 generates a voltage at the frequency for which the synchro is designed. Typically, this is in the order of 400 cycles per second. The pulse former provides output pulses at a pulse repetition rate numerically equal to the product of the capacity of the counter and the frequency of the reference source. In the example assumed, counting pulses would be produced at a repetition rate of $2^{10} \times 400$ cycles per second. This permits the counter to be driven through its entire range of values for each cycle of the reference source.

Only a few stages of the register 11, and the counter 15 together with the associated circuits are illustrated in FIG. 2 for the sake of simplicity. It will be evident to those skilled in the art, however, that the stages omitted from the drawings are connected in the same fashion as the 2° and 2′ stages.

A bank of comparators 19 is inserted between the register and the counter. This bank contains a conventional comparison circuit for each stage in the register and counter and serves to produce an output signal whenever the binary state of the associated register stage agrees with the binary state of the associated counter stage. Thus, whenever the 2° stages of the register and the counter are both in the binary ONE state or both in the binary ZERO state, an output signal will appear on a comparison line such as the line 21.

The output signals from the comparator stages are also passed through individual inverter circuits 23 so as to produce an inverter signal whenever the corresponding register and counter stages disagree.

The output terminals of all but the two most significant comparator stages are coupled to a first primary AND gate 25. The inverters associated with these same comparator stages are coupled to a second primary AND gate 27.

A first quadrature comparator 29 is connected to produce an output signal whenever the two most significant counter stages disagree. The output of this comparator is applied to a second quadrature comparator 31. This output is also inverted in a first quadrature inverter 33 and applied to the comparator 31. The comparator 31 is further connected to the output of the most significant register stage so as to produce an output signal whenever the associated register stage is in the binary ONE state and the comparator 29 is producing a direct output signal or when the associated register stage is in the binary ZERO state and the comparator 29 is providing no direct output signal. The output of the comparator is applied to a second quadrature inverter 35. Thus both direct and inverted second quadrature signals are available.

Eight secondary AND gates 37 are connected to various combinations of primary AND gates, inverters, and quadrature comparators to provide switching pulses each time that the angular displacement of the A.C. reference voltage equals the following functions of the input angle $\theta$:

$$(\theta) \text{ and } (\theta+180°)$$
$$(-\theta) \text{ and } (-\theta+180°)$$
$$(\theta+90°) \text{ and } (\theta+270°)$$
$$(-\theta+270°) \text{ and } (-\theta+90°)$$

In other words, whenever the count in the counter 15 corresponds to the input angle, a "$\theta$" pulse is produced by the bank of gates 37 to indicate this occurrence; whenever the count in the counter corresponds to an angle 180° greater than the input angle, a "$(\theta+180°)$" pulse is produced to indicate this occurrence, and so forth.

The manner in which the secondary AND gates are connected in the circuit so as to produce pulses at these times can best be understood by referring to the following table of logic expressions together with the symbols of FIG. 2:

$$(\theta)=K_a \cdot K_8 \cdot K_9$$
$$(\theta+180°)=K_a \cdot K_8 \cdot \overline{K_9}$$
$$(-\theta)=K_b \cdot \overline{K_8} \cdot \overline{K_9}$$
$$(-\theta+180°)=K_b \cdot \overline{K_8} \cdot K_9$$
$$(\theta+270°)=K_a \cdot \overline{K_8} \cdot \overline{(K_9-90°)}$$
$$(\theta+90°)=K_a \cdot K_8 \cdot (K_9-90°)$$
$$(-\theta+90°)=K_b \cdot K_8 \cdot (K_9-90°)$$
$$(-\theta+270°)=K_b \cdot K_8 \cdot \overline{(K_9-90°)}$$

It will be noticed that four of these pulses ($\theta$, $\theta+90°$, $\theta+180°$, and $\theta+270°$) are pulses occurring at an angle of $\theta$ and at the first, second, and third quadrants with respect to $\theta$. The remaining pulses occur at $-\theta$ and at corresponding quadrants with respect to $-\theta$. Thus the first four pulses mentioned may be described as $\theta$ referenced quadrant switching pulses and the remaining pulses may be described as $-\theta$ referenced quadrant switching pulses.

Figure 3:
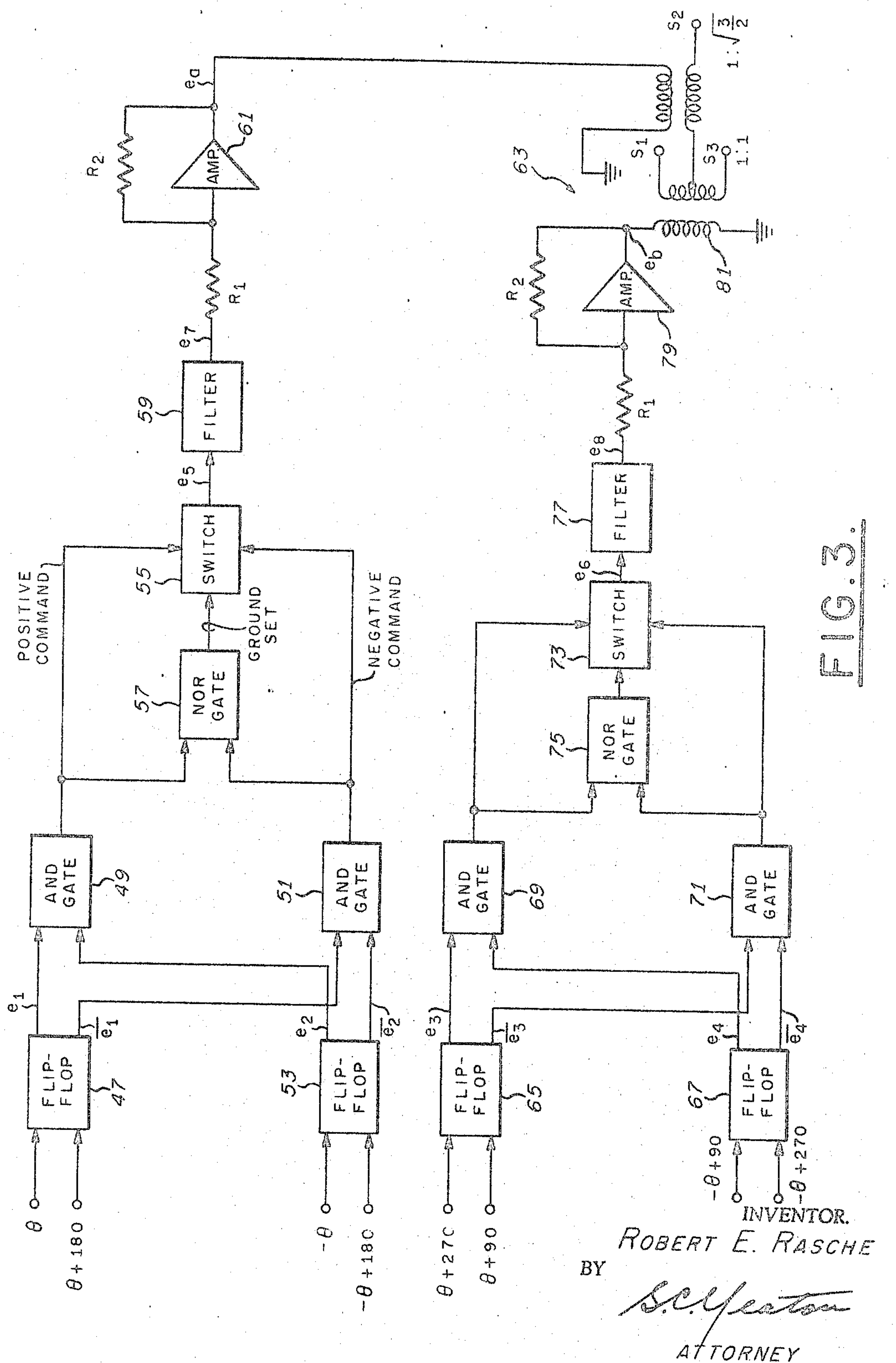
FIG. 3 is a block diagram illustrating a waveform generator useful in practicing the invention.

FIG. 3 represents a waveform generator which is connected to receive the switching pulses from the comparator circuit of FIG. 2 as indicated. The waveform generator consists of two sine wave conversion circuits for converting switching pulses into variable amplitude sine waves. The first sine wave conversion circuit contains a first four pulses mentioned may be described as $\theta$ refer- $\theta+180°$ pulses. These pulses serve to switch the flip-flop 47 into the set or reset state and provide steady switching voltages to an AND gate 49 or an AND gate 51. Similarly, the signals supplied to the flip-flop 53 serve to switch this flip-flop to the set or reset state and to provide corresponding steady switching voltages to the AND gate 49 or 51. The AND gates 49 and 51 are connected directly to a switch 55 and also through a NOR gate 57 to the same switch. The switch is basically a three position switch that serves to provide a positive reference voltage, a negative reference voltage, or zero voltage to the filter 59 in response to signals from the AND gate 49, the AND gate 51, or the NOR gate 57, respectively. The switch is of straightforward design and may consist, for example, of three saturable transistors connected in parallel so that one of the transistors couples the output of the switch to a positive reference voltage in response to a signal from the gate 49; so that a second of the transistors connects the output of the switch to a source of negative reference voltage in response to a signal from the gate 51; and so that the third transistor connects the output terminal to ground in response to an output signal from the NOR gate 57.

The sources of reference voltage are not shown specifically in FIG. 3, however, they may consist of any convenient D.C. source that provides stable and equal positive and negative voltages.

The filter 59 is constructed to pass a frequency equal to that of the reference source. Thus in the example assumed, the filter would be designed to pass a band of frequencies including a frequency of 400 cycles per second.

The output of the filter is applied to high gain negative feedback amplifier 61 and then to a primary winding on the Scott transformer 63.

A second sine wave conversion circuit comprising the flip-flops 65 and 67, the AND gates 69 and 71, the switch 73, and the NOR gate 75 is identical to the corresponding elements previously discussed. The output of the switch 73 is passed through a 400 cycle per second bandpass filter 77 to a second negative feedback amplifier 79. The output of the amplifier 79 is applied to a primary winding 81 on the Scott transformer. The Scott transformer is a conventional transformer, well known in the art, and of the type ordinarily used for converting a two-phase input signal into a three-phase output signal.

Figure 4:
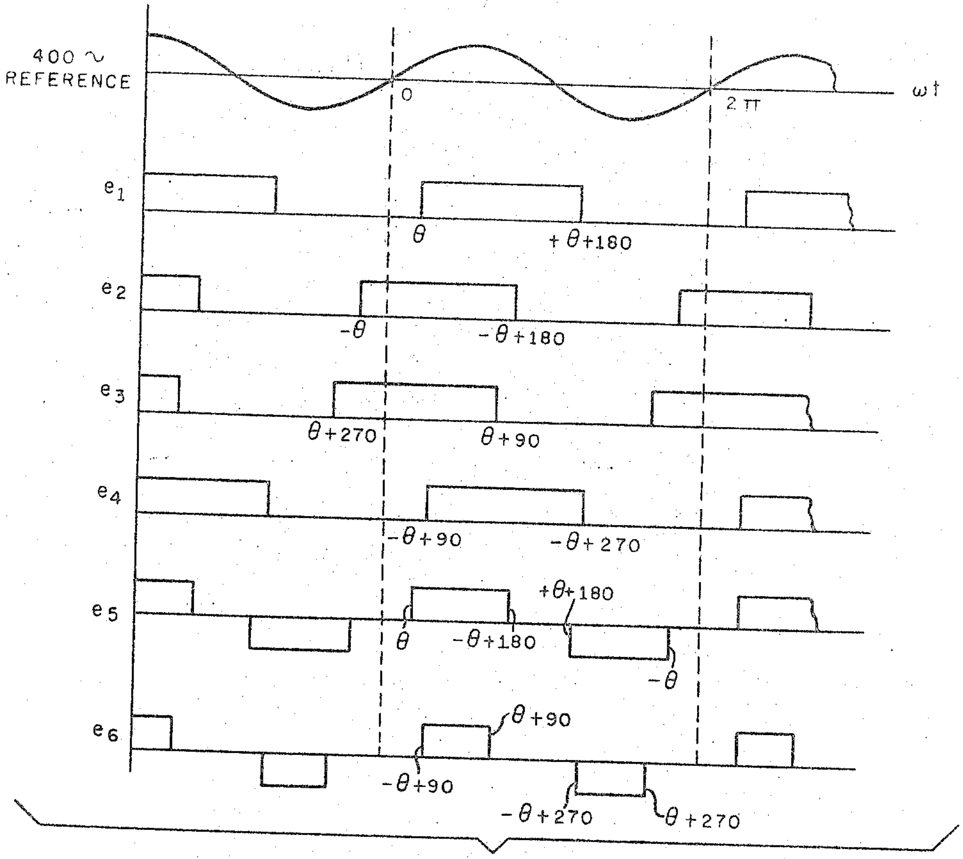
FIG. 4 is a diagram illustrating the waveforms occurring in the digital-synchro converter of the invention.

The operation of the waveform generator of FIG. 3 can be visualized with the aid of the waveform diagrams of FIG. 4.

Each flip-flop produces a TRUE voltage from the time that a switching pulse is applied to its upper input terminal until a subsequent pulse is applied to its lower input terminal as indicated in curves $e_1$, $e_2$, $e_3$ and $e_4$ in FIG. 4. During intervals between the pulses of these curves, the flip-flop produces a corresponding NOT voltage.

The output of the AND gate 49 constitutes a command signal that serves to connect a positive reference voltage to the filter 59 during the times that both of the flip-flops 47 and 53 are producing direct voltages. Similarly the AND gate 51 provides a command signal that serves to connect a negative reference signal to the filter 59 during the time that the same flip-flops are both producing NOT voltages.

During the time that neither of the AND gates 49 and 51 are producing a command signal, the NOR gate 57 produces an output signal that returns the output terminal of the switch to ground potential so that the voltage $e_5$ remains at zero level.

The counterparts of these elements for producing $e_6$ operate in a similar fashion.

The manner in which the voltages $e_5$ and $e_6$ are formed can be visualized with the help of FIG. 4. The durations of the pulses constituting the wave trains $e_5$ and $e_6$ vary with changes in the angle $\theta$ in a manner such that the duty-cycle of one wave train increases as the duty-cycle of the other wave train decreases.

It will be noticed that the waves $e_5$ and $e_6$ are stepped rectangular waves, that is, the voltage drops to zero between pulses. As the duty-cycle of either wave approaches zero, the area of the pulses approaches zero gradually so that the energy in the wave also approaches zero gradually.

The waves $e_5$ and $e_6$ are applied to the filters 57 and 77. The filters pass only the fundamental frequency component of the rectangular waves. Thus $e_7$ and $e_8$ are essentially 400 cycle per second sine waves with an amplitude dependent upon the duty-cycle of the waves $e_5$ and $e_6$ respectively. More precisely, for lossless filters:

$$e_7=\frac{4E}{\pi}\cos\theta\sin\omega t$$

$$e_8=\frac{4E}{\pi}\sin\theta\sin\omega t$$

where E represents the constant amplitude of the rectangular pulses and $\omega$ is the radian frequency of the A.C. reference voltage.

Assuming infinite gain amplifiers with 180° phase reversal, the voltages applied to the Scott transformers are:

$$e_a=-\frac{4E}{\pi}\cdot\frac{R_2}{R_1}\cos\theta\sin\omega t$$

$$e_b=-\frac{4E}{\pi}\cdot\frac{R_2}{R_1}\sin\theta\sin\omega t$$

Letting A equal a constant, the resulting output voltages of the Scott transformer become:

$$S_3-S_1=A\sin\theta\sin\omega t$$

$$S_1-S_2=A\sin(\theta-120°)\sin\omega t$$

$$S_2-S_3=A\sin(\theta+120°)\sin\omega t$$

These voltages are suitable to drive the synchro receiver as indicated in FIG. 1.

The operation of the converter may be understood by referring to the various circuit diagrams and the graphs of FIG. 4. Assume that the unknown input angle $\theta$ is that depicted in FIG. 4 and equal to 22.5°.

The operation of the over-all converter may best be understood by first considering the operation of the comparator circuit of FIG. 2 under these conditions.

With an angle of 22.5° stored in the register 11, each stage except the $2^6$ stage will be in the ZERO state. That is, the counter will contain the following binary number:

0000001000

The count of the counter 15, of course, will be continually changing in accordance with the changing voltage from the A.C. reference 18. However, it will be instructive to first consider conditions at the time that the angular displacement of the A.C. reference voltage is zero. At this time, each stage of the binary counter 15 is in the binary ZERO state. As the angular displacement of the A.C. reference voltage increases, the count in the counter also increases.

It will be remembered from the foregoing table of logic expressions that either a $K_a$ or $K_b$ signal from the AND gates 25 or 27 is required before any of the AND gates 37 can produce an output signal. A $K_a$ signal, however, is produced only when each of the stages $2^0$ through $2^7$ in the counter agree with the corresponding stages in the register. Similarly, a $K_b$ signal is produced only when each of these pairs of stages is in a different state. Therefore with the assumed angle $\theta$, no output signal is provided by the AND gates 37 until the counter reaches the state that agrees with the state of the register. At this instant, the state of each stage in the counter agrees with that of each corresponding stage in the register, whereupon a $\theta$ pulse is produced at the uppermost gate 37. This indicates that the counter 15 at that instant contains a count equivalent to the unknown angle $\theta$.

As the angular displacement of the A.C. reference voltage continues to increase, each of the AND gates 37 will be closed until the angular displacement becomes equal to the next specified function of the angle $\theta$. For the assumed angle of 22.5°, this will occur at $(-\theta+90)$ or 67.5°. For an angle of this magnitude, the counter will be in the 1111110100 state, whereas the register 11 remains in the 0000001000 state.

Thus, only the $2^8$ and $2^9$ counter stages agree with the corresponding register stages. In this situation, the AND gate 27 is opened and a $K_b$ signal is produced.

Since the $2^8$ stages agree, a $K_8$ signal is also produced.

Since both the $2^8$ and $2^9$ counter stages are in the binary ZERO state, the first quadrant comparator 29 produces no output. However, this permits an inverted signal to flow from the inverter circuit 33.

Since the $2^9$ stage of register 11 is in the binary ZERO state, corresponding input terminals of the second quadrant comparator 31 will be energized and this comparator will produce a $(K_9-90)$ signal.

Since $K_b$, $K_8$ and $(K_9-90)$ signals are available, the bottom AND gate 37 as depicted in FIG. 2 will be opened, and a $(-\theta+90)$ signal will be produced, thus indicating that at this time, the angular displacement of the reference voltage is equal to that function of the unknown angle $\theta$.

By continuing in this fashion, it can readily be shown that successive AND gates in the bank 37 will be opened momentarily as the angular displacement of the reference voltage sweeps through values equal to the specified functions of $\theta$.

These pulses are applied to the appropriate flip-flops as indicated in FIG. 3.

The operation of the waveform generator of FIG. 3 may be understood by referring to that figure together with the corresponding graphs of FIG. 4.

Assuming the same unknown angle of $\theta=22.5°$, consider the situation when the angular displacement of the A.C. reference voltage is zero. Flip-flops 53 and 65 will then be in the state that produces $e_2$ and $e_3$ voltages, respectively, since these flip-flops had been previously switched to that state as the A.C. reference voltage swept through the $-\theta$ and $(\theta+270)$ displacements in the last completed cycle. At this time, flip-flops 47 and 67 remain in the state that produces $\bar{e}_1$ and $\bar{e}_4$ voltages.

Under these conditions, none of the AND gates 49, 51, 69 or 71 is open. The NOR gates 57 and 75 set the switches 55 and 73 to ground set condition and neither an $e_5$ nor an $e_6$ voltage is produced.

When the angular displacement of the A.C. reference voltage becomes equal to the input angle $\theta$, the comparator circuit of FIG. 2 produces a $\theta$ pulse that switches the flip-flop 47 of FIG. 3 to produce an $e_1$ voltage. AND gate 49 now receives both $e_1$ and $e_2$ voltages so as to produce a positive command signal to the switch 55. This establishes a positive $e_5$ voltage.

When a comparator circuit of FIG. 2 produces a $(-\theta+90)$ voltage, flip-flop 67 of FIG. 3 is switched and an $e_4$ voltage is produced. This voltage, together with the $e_3$ voltage already in existence, opens the AND gate 69 so as to establish a positive $e_6$ voltage at the output of the switch 73.

The angular displacement of the A.C. reference voltage next sweeps through $(\theta+90)$ or 112.5°. The flip-flop 65 is thereby switched so as to terminate the $e_3$ voltage and return the switch 73 to the ground set condition. This terminates the voltage $e_6$ as indicated in FIG. 4.

The angular displacement of the reference voltage continues to increase and it next sweeps through $(-\theta+180)$ or 157.5°. The flip-flop 53 is switched so as to terminate the $e_2$ voltage and return the switch 55 to the ground set condition. The voltage $e_5$ is thus returned to ground. The angular displacement of the reference voltage next becomes equal to $(\theta+180)$ or 212.5°. The corresponding voltage pulse produced in the comparator circuit of FIG. 2 switches the flip-flop 47 of FIG. 3 so as to terminate the $e_1$ voltage and produce $\bar{e}_1$ voltage so as to open gate 51. This produces a negative command signal which actuates the switch 55 so as to produce a negative $e_5$ signal as shown in FIG. 4.

The A.C. reference voltage next sweeps through the $(\theta+270)$ or 292.5° point. The comparator circuit produces a corresponding pulse which switches the flip-flop 65 and again produces an $e_3$ voltage. This closes the gate 71 and terminates the voltage $e_6$.

Shortly thereafter, the A.C. reference voltage sweeps through the $-\theta$ (337.5°) point. The resulting $-\theta$ pulse from the comparator circuit switches the flip-flop 53 so that it now produces an $e_2$ rather than an $\bar{e}_2$ voltage. All of the AND gates 49, 51, 69 and 71 are now closed. Neither an $e_5$ nor an $e_6$ voltage is produced during the following interval.

This chain of events is repeated for each cycle of the A.C. reference voltage until the angle represented by the input voltage is changed.

The rectangular voltage pulses $e_5$ and $e_6$ are transformed into sinusoidal voltages by the filters 59 and 77, amplified, and thereafter applied to the Scott T transformer 63 as voltages $e_a$ and $e_b$ in a manner discussed previously. The Scott T transformer operates on these voltages in a conventional manner to produce the voltages indicated in FIG. 1. These voltages cause the synchro rotor to assume a position determined by angle $\theta$ and indicated as $\theta_0$ as well known in the synchro art.

Although a Scott transformer is presently preferred for converting the two signals $e_7$ and $e_8$ to three synchro stator voltages, it will be appreciated that other suitable two-phase to three-phase converters are known in the art and may be used if desired.

Furthermore, although the circuit of FIG. 2 is presently preferred as a comparator for producing $\theta$ referenced quadrant pulses and $-\theta$ referenced quadrant pulses, variants of this circuit will be obvious to those skilled in the art.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A digital-synchro converter comprising register means for storing digital information representing an angle $\theta$; readout means for cyclically interrogating said register means; first logic means responsive to said readout means for producing a first series of $\theta$ referenced quadrant switching pulses at cyclical interrogating times representative of specified functions of the stored angle $\theta$; second logic means responsive to said readout means for producing a second series of $-\theta$ referenced quadrant switching pulses at cyclical interrogating times representative of specified functions of the angle $-\theta$; gating means to produce first and second trains of stepped rectangular waves each having a duty cycle representative of the time lag between selected pulses in said first and second series of switching pulses, said gating means including first, second, third and fourth flip-flops, said flip-flops being connected to be switched to the SET state by $\theta°$, $-\theta°$, $$\theta+270°, \text{ and } -\theta+90°$$

quadrant switching pulses respectively, said flip-flops being further connected to be switched to the RESET state after half of an interrogation cycle, said gating means further including means to produce a first stepped rectangular wave having positive-going portions only during the time that said first and second flip-flops are both in the SET state and negative-going portions only during the time that said first and second flip-flops are both in the RESET state; means to produce a second stepped rectangular wave having positive-going portions only during the time that said third and fourth flip-flops are in the SET state and negative-going portions only during the time that said third and fourth flip-flops are in the RESET state; first and second filter means constructed to extract the fundamental frequency component of said first and second trains, respectively; and conversion means to produce three synchro stator voltages in response to the signals from both of said filter means.

2. The apparatus of claim 1 wherein said flip-flops are connected to be switched to the RESET state by $\theta+180°$, $-\theta+180°$, $\theta+90°$, and $-\theta+270°$ switching pulses respectively, wherein the positive and negative-going portions of said first stepped rectangular wave constitute first and second command signals respectively, and the positive and negative-going portions of said second stepped rectangular wave constitute third and fourth command signals respectively, and wherein the first train of stepped rectangular waves has positive-going portions during the occurrence of a first command signal and negative-going portions during the occurrence of a second command signal, and the second train of stepped rectangular waves has positive-going portions during the occurrence of a third command signal and negative-going portions during the occurrence of a fourth command signal.

3. The apparatus of claim 2 wherein said first train of stepped rectangular waves has positive and negative-going portions synchronized with said first and second command signals respectively, and said second train of stepped rectangular waves has positive and negative-going portions synchronized with said third and fourth command signals respectively.

4. The apparatus of claim 2 wherein the gating means includes first and second sine wave conversion circuits; each of said sine wave conversion circuits containing two of said flip-flops, first and second AND gates connected to receive the TRUE outputs of both flip-flops and the NOT outputs of both flip-flops respectively, a NOR gate connected to the outputs of both AND gates, and a three-position switch connected to receive the output of either AND gate or the NOR gate; the flip-flops in the first sine wave conversion circuit being connected to receive $\theta$ and $\theta+180°$ switching pulses and $-\theta$ and $-\theta+180°$ switching pulses respectively; the flip-flops in said second sine wave conversion circuit being connected to receive $\theta+270°$ and $\theta+90°$ switching pulses and $-\theta+90°$ and $-\theta+270°$ switching pulses respectively.

5. The apparatus of claim 1 in which the conversion means is a Scott connected transformer circuit.

6. Apparatus for converting digitally coded angle information into stator voltages for driving a synchro receiver comprising:

(a) register means to store digitally coded information representing an angle $\theta$;

(b) a digital counter having a capacity equal to that of the register means;

(c) means to apply pulses to said counter at a rate numerically equal to the capacity of the counter times the frequency of the desired sine wave;

(d) comparison means to detect the instantaneous binary state of each stage in the counter with respect to that of the corresponding stage in the register;

(e) first logic means connected to selected stages in the comparison means for providing cyclical $\theta$ switching pulses whenever the binary state of each counter stage agrees with that of the corresponding register stage;

(f) additional logic means in said first logic means connected to produce $\theta$ referenced switching pulses whenever an additional number of counts equal to one-quarter the capacity of the counter is added to the counter;

(g) second logic means connected to selected stages in the comparison means for providing cyclical $-\theta$ switching pulses whenever the binary state of each counter stage disagrees with that of each corresponding register stage;

(h) additional means in said second logic means to produce $-\theta$ referenced switching pulses whenever an additional number of counts equal to one-quarter the capacity of the counter is added to the counter;

(i) first and second flip-flops connected to be set by a $\theta$ switching pulse and by a $-\theta$ switching pulse respectively;

(j) third and fourth flip-flops connected to be set by a third quadrant $\theta$ referenced switching pulses and by a first quadrant $-\theta$ referenced switching pulse respectively;

(k) each of said flip-flops being further connected to the logic means so as to be reset after remaining in the set state for one-half of a switching cycle;

(l) first gating means to provide a first stepped rectangular wave, said first gating means being connected to said first and second flip-flops so as to pass a positive voltage whenever both flip-flops are in the set state and a negative voltage whenever both flip-flops are in the reset state;

(m) second gating means to provide a second stepped rectangular wave, said second gating means being connected to said third and fourth flip-flops so as to provide a positive voltage whenever both flip-flops are in the set state and a negative voltage whenever both flip-flops are in the reset state;

(n) first and second bandpass filters connected to said first and second gating means respectively and constructed to pass the fundamental frequency component of the stepped rectangular waves;

(o) conversion means connected to receive the output signals from both filters; and (p) output terminals on said conversion means for connecting the apparatus to a synchro receiver.

References Cited

UNITED STATES PATENTS

| | | | |
|---|---|---|---|
| 3,317,905 | 5/1967 | Hunt | 340—347 |
| 3,349,230 | 10/1967 | Hartwell et al. | 340—347 X |
| 3,371,334 | 2/1968 | Asher et al. | 340—347 |

MAYNARD R. WILBUR, Primary Examiner

CHARLES D. MILLER, Assistant Examiner

U.S. Cl. X.R.

235—92